(12) United States Patent
Des Noes et al.

(10) Patent No.: US 7,751,468 B2
(45) Date of Patent: Jul. 6, 2010

(54) ESTIMATION OF A SIGNAL-TO-INTERFERENCE PLUS NOISE RATIO AT THE OUTPUT OF AN OFDM CDMA RECEIVER

(75) Inventors: Mathieu Des Noes, Grenoble (FR); Dimitri Ktenas, Fontaine (FR); Luc Maret, Grenoble (FR); Youssef Nasser, Saint Martin d'Heres (FR)

(73) Assignee: Commissariat a l'Energie Atomique, Paris (FR)

( * ) Notice: Subject to any disclaimer, the term of this patent is extended or adjusted under 35 U.S.C. 154(b) by 604 days.

(21) Appl. No.: 11/575,576

(22) PCT Filed: Sep. 19, 2005

(86) PCT No.: PCT/FR2005/050762

§ 371 (c)(1),
(2), (4) Date: Mar. 20, 2007

(87) PCT Pub. No.: WO2006/032817

PCT Pub. Date: Mar. 30, 2006

(65) Prior Publication Data

US 2007/0258510 A1 Nov. 8, 2007

(30) Foreign Application Priority Data

Sep. 21, 2004 (FR) .................................. 04 52107

(51) Int. Cl.
*H04B 1/00* (2006.01)
*H04N 7/12* (2006.01)
(52) U.S. Cl. .................... 375/150; 375/148; 375/240.27

(58) Field of Classification Search ................. 375/149, 375/147, 148, 146, 150, 136, 137, 135, 295, 375/316, 345, 362, 346, 347, 348, 240.26–240.27, 375/254, 284–285, 278; 370/208, 203, 210, 370/320, 342, 347, 345, 441, 442, 436
See application file for complete search history.

(56) References Cited

U.S. PATENT DOCUMENTS

| | | | | |
|---|---|---|---|---|
| 6,771,706 | B2 * | 8/2004 | Ling et al. | 375/267 |
| 6,904,283 | B2 * | 6/2005 | Li et al. | 455/450 |
| 7,023,265 | B1 | 4/2006 | Helard et al. | |

(Continued)

OTHER PUBLICATIONS

Heidi Steendam, et al. "The Effect of Synchronisation Errors on MC-CDMA Performance", IEEE International Conference on Communications, XP-000903624, Jun. 6, 1999, pp. 1510-1514.

(Continued)

*Primary Examiner*—David C Payne
*Assistant Examiner*—Linda Wong
(74) *Attorney, Agent, or Firm*—Oblon, Spivak, McClelland, Maier & Neustadt, L.L.P.

(57) ABSTRACT

A method of estimating an SINR ratio of an OFDM-CDMA transmission signal spread with spread codes, the transmission signal being transmitted between a transmission apparatus and a receiver apparatus, the method including: receiving the signal spread with spread codes at the receiver apparatus; and calculating, with a processor at the receiver apparatus, an estimate of the SINR ratio for the signal spread with the spread codes independently of a value of the spread codes.

7 Claims, 4 Drawing Sheets

U.S. PATENT DOCUMENTS

| | | | |
|---|---|---|---|
| 7,054,375 B2 * | 5/2006 | Kannan et al. | 375/260 |
| 7,191,381 B2 * | 3/2007 | Gesbert et al. | 714/759 |
| 2002/0056066 A1 * | 5/2002 | Gesbert et al. | 714/759 |
| 2002/0147017 A1 * | 10/2002 | Li et al. | 455/447 |
| 2002/0159422 A1 * | 10/2002 | Li et al. | 370/342 |
| 2002/0191703 A1 * | 12/2002 | Ling et al. | 375/267 |
| 2003/0026201 A1 * | 2/2003 | Arnesen | 370/210 |
| 2004/0095907 A1 * | 5/2004 | Agee et al. | 370/334 |

OTHER PUBLICATIONS

Jamie Evans, et al. "Large System Performance of Linear Multiuser Receivers in Multipath Fading Channels", IEEE Transactions in Information Theory, XP-002329715, vol. 46, No. 6, Sep. 2000, pp. 2059-2078.

Heiko Schmidt, et al. "Channel Tracking in Wireless OFDM Systems", 5$^{th}$ World Multi-Conference on Systemics, Cybernetics and Informatics, XP-002329716, Jul. 22, 2001 5 Pages.

Maryline Helard, et al. "Multicarrier CDMA Techniques for Future Wideband Wireless Networks", Annales Des Telecommunications, XP-001082129, vol. 56, No. 5/6, May 2001, pp. 260-274.

J.-M. Chaufray, et al. "Asymtotic Analysis of Optimum and Sub-Optimum CDMA Downlink MMSE Receivers", International Symposium on Signal Processing and Its Applications, XP-010653236, vol. 1, Jul. 1, 2003, pp. 493-496.

M. Debbah, et al. "Asymptotic Performance Analysis for Redundant Block Precoded OFDM Systems With MMSE Equalization", IEEE Signal Processing Workshop on Statistical Signal Processing, XP-010561158, Aug. 6, 2001, pp. 389-392.

J.-M. Chaufray, et al. "Asymtotic Analysis of Optimum and Sub-Optimum CDMA Downlink MMSE Receivers", IEEE Transactions on Information Theory, vol. 50, No. 11, Nov. 2004, pp. 2620-2638.

Zhengdao Wang, et al. "Wireless Multicarrier Communications Where Fourier Meets Shannon", IEEE Signal Processing Magazine, vol. 17, No. 3, May 2000, pp. 1-21.

M. Debbah, et al. "MMSE Analysis of Certain Large Isometric Random Precoded Systems", IEEE Transactions on Information Theory, vol. 49, No. 5, May 5, 2003, pp. 1293-1311.

L. Hanzo, et al. "OFDM and MC-CDMA for Broadband Multi-User Communications, WLANs, and Broadcasting", IEEE Press, 2003, pp. 272-279, 562-563 and 746-747.

* cited by examiner

ESTIMATION OF A SIGNAL-TO-INTERFERENCE PLUS NOISE RATIO AT THE OUTPUT OF AN OFDM CDMA RECEIVER

TECHNICAL DOMAIN AND PRIOR ART

This invention relates to the field of signal processing.

Its purpose is particularly a method of estimating the signal to interference-plus-noise ratio (SINR) for a downlink in a multicarrier system with a CDMA type multiple access.

The invention is used in telecommunications, namely communication systems making use of the CDMA multiple access technique combined with an OFDM transmission:

MC-CDMA,

MC-DS-CDMA,

Two dimensional time/frequency spread.

The invention takes account of the effect of synchronization errors, assuming that spread codes are orthogonal. This refers to the offset between carrier frequencies of the transmitter and the receiver and the offset between the transmitter and receiver sampling clocks.

For example, SINR is used to estimate the binary error rate at the receiver, which indicates the quality of the communication. It can also be used by power control algorithms.

FIG. 1 shows the diagram for a conventional digital radio transmission. Bits to be transmitted are firstly processed and formatted by a digital transmitter 2.

The digital samples stream is then converted into analogue by a digital/analogue converter (DAC) 4 operating at frequency FS1.

The resultant signal is then filtered, amplified and transposed to frequency $F_{o1}$, and then transmitted through an antenna 8.

The transmitted signal then passes through the propagation channel 10 before reception.

The output signal from a reception antenna 12 is then amplified, filtered and transposed into base band by a frequency $F_{o2}$.

The analogue signal is then sampled at frequency FS1 by the analogue/digital converter (ADC) 14 and is then processed by the digital receiver 16 to output the bits received.

It is assumed in the following that the filters of the RF heads of the transmitter and the receiver are taken into account in a global channel.

For perfect synchronisation, we will have $F_{S1}=F_{S2}$ and $F_{o1}=F_{o2}$.

In a real system, there is an offset between the carrier frequencies of the transmitter and the receiver $\Delta F=F_{o1}-F_{o2}$ and an offset between the sampling clocks of the transmitter and the receiver $\Delta T=1/F_{S1}-1/F_{S2}$.

In the following, we will refer to a system using a time/frequency spread that will be denoted by the generic term OFDM-CDMA. This system models the general case: if the spread is frequency only, the result will be a conventional MC-CDMA system, and if the spread is time only the result will be an MC-DS-CDMA system.

We will also describe the effect of the $\Delta F$ and $\Delta T$ offsets on modelling of the channel in base band.

FIG. 2 shows the general model of an OFDM-CDMA digital transmitter 20 for a downlink from a base station to a mobile terminal.

Different user data are firstly processed by a spread module 22, the spread signals are then processed by a <<chip>> allocation module 24 that puts them onto a time/frequency grid, and module 25 then does a serial-parallel conversion.

The resultant signal is then transmitted to an OFDM modulator 26 using an Inverse Fast Fourier transform (IFFT) module 28, with size N. The data are then subjected to a parallel-serial conversion (module 29).

A description of classical OFDM techniques is given in the document by W. Zhendao and G. B. Giannakis, Wireless Multicarrier Communications—Where Fourier meets Shannon, IEEE Signal Processing Magazine, Vol. 17, Issue: 3, May 2000.

FIG. 3 shows details of the spread module 22 of the transmitter.

An amplitude $\sqrt{Pk}$ is firstly assigned to each symbol $d_k(n)$ of the user k. The rate is then increased by a factor L, and finally a digital filtering is done by $c_k(z)$, the coefficients of which are equal to the chips of the spread sequence of user k. The spread signals are then added.

The chip allocation module 24 then distributes the samples from the spread module 22 onto a time/frequency grid. It is assumed that the spread factor $L=S_F \times S_T$, where $S_F$ is the spread factor in the frequency domain and $S_T$ in the time domain.

If $S_T=1$, the characteristics are the same as for a conventional MC-CDMA system. As illustrated on FIG. 4, $D=N/S_F$ data symbols are then transmitted by code in one OFDM symbol.

If $S_F=1$, the characteristics are the same as for a conventional MC-DS-CDMA system. As illustrated on FIG. 5, 1 data symbol is then transmitted by code in $S_T$ OFDM symbols.

If $S_F$ and $S_T$ are arbitrary, then there is a time/frequency spread. As illustrated on FIG. 6, $D=N/S_F$ data symbols are then transmitted by code on $S_T$ OFDM symbols.

At the output from the chip allocation module 24, there is a vector with size N corresponding to the size of the FFT:

$$x_i[qS_F + p] = \sum_{k=0}^{K-1} \sqrt{P_k}\, d_k[q] c_k[pS_T + i]$$

$$i = 0, \ldots, S_T - 1; q = 0, \ldots, D-1, p = 0, \ldots, S_F - 1$$

After transposition into the time domain using the IFFT, the means 30 (FIG. 2) then add a cyclic prefix. It contains $N_G \geq W-1$ samples where W is the maximum duration of the pulse response of the global channel, as described in the document by W. Zhendao and al. already described above.

The structure of a conventional digital OFDM-CDMA receiver is shown in FIG. 7.

A coarse synchronisation module 36:

Detects the beginning of the symbol OFDM.

Makes the initial estimate of the offsets $\Delta F$ and $\Delta T$. This estimate is <<coarse>> in that the variance of the estimate is high. This will bring it within the operating range of the receiver, but will require a <<fine>> correction to reach the required performances. Thus, the synchronisation is done in 2 steps.

After a <<coarse>> synchronisation, the cyclic prefix is eliminated (module or means 38) and the signal is conditioned into vectors of N samples: $M_i(m)$, $m=0, \ldots, N-1$. The index i indicates the number of the OFDM symbol received.

A module or means 40 of making a fast Fourier transform (FFT) is (are) used to make the inverse transform of that done during the emission (FIG. 2).

The next step is means 42 for estimating each channel and the corresponding received power, equalising means 44, and correlation means 46.

Means 48 are used to calculate an estimate of the SINR (Signal to Interference-Plus-Noise ratio).

This ratio is estimated in a known manner by making approximations on the codes: the codes are assumed to be arbitrarily equal to +1 and −1.

Therefore the SINR ratio is systematically underestimated.

With this estimate, the orthogonality information of the codes is also lost.

Therefore, the problem arises of finding a more reliable method of estimating the SINR ratio.

PRESENTATION OF THE INVENTION

The invention relates firstly to a method of estimating the SINR ratio of an OFDM-CDMA type transmission using spread codes (Ck), in which this ratio is estimated independently of the value of these codes.

Such a method can eliminate the influence of necessary approximations on codes, as made in prior art.

In particular, the invention can be used to estimate the SINR:

for an OFDM-CDMA system using a 2-dimensional spread in the time and frequency domains, or for an OFDM-CDMA system using a 2-dimensional spread with a channel varying in time, If the codes are orthogonal, the SINR ratio may be estimated taking account of the orthogonality of codes.

As explained above, the spread code may also be two-dimensional or single dimensional, for example of the MC-DS-CDMA type.

The SINR ratio may be calculated using the following formulas:

$$E|I_0|^2 = P_0 |tr(G(q)A(q, q))|^2$$

$$E|I_1|^2 = P_0 \sum_{\substack{n=0 \\ n \neq q}}^{D-1} |tr(G(q)A(n, q))|^2$$

$$E|I_2|^2 = \alpha \overline{p} \sum_{n=0}^{D-1} (tr(G(q)A(n, q)A(n, q)^H G(q)^H) - |tr(G(q)A(n, q))|^2)$$

$$E|I_3|^2 = \sigma^2 tr(G(q)G(q)^H)$$

in which:

$I_0$ is the amplitude of the useful signal for a user after equalisation and correlation, $I_1$ represents interference generated by data of the user considered in the other sub-bands, $I_2$ is the multiple access noise created by other spread codes, $I_3$ is the Gaussian noise filtered by the equaliser and the sequence of the user considered, $\alpha$ is the system load and $\overline{p}$ is the average received power, $P_0$ is the power of the signal spread with the spread code for which the SINR is to be calculated, A and G are the attenuation channel and equalisation matrices respectively, D is the number of data symbols per code on ST OFDM symbols.

The invention also relates to a method for reception of signals transmitted using an OFDM-CDMA type transmission, in which an independent equalisation of spread codes is made followed by a method of estimating the SINR ratio of the transmission as described above.

It also relates to a method of reception of signals transmitted according to an OFDM-CDMA type transmission in which an MRC or EGC or ZF or MMSEC type equalisation is carried out followed by a method of estimating the SINR ratio of the transmission as described above.

It also relates to a method of transmitting signals in which:

signals are transmitted by a transmitter device towards wireless telephony devices, at least one of said devices calculates or estimates the SINR ratio of the transmission as described above, this ratio is retransmitted to the transmitter device.

The invention also relates to a wireless telephony device comprising means of calculating the SINR ratio of an OFDM-CDMA type transmission, which uses spread codes ($C_k$) in which this ratio is estimated independently of the value of these codes.

If the spread codes are orthogonal, the SINR ratio may be estimated taking account of the orthogonality of these codes.

In such a device, the SINR ratio may be estimated using the formulas mentioned above.

DETAILED PRESENTATION OF PARTICULAR EMBODIMENTS

We will now describe a method of estimating the SINR ratio according to the invention.

Figure 7:
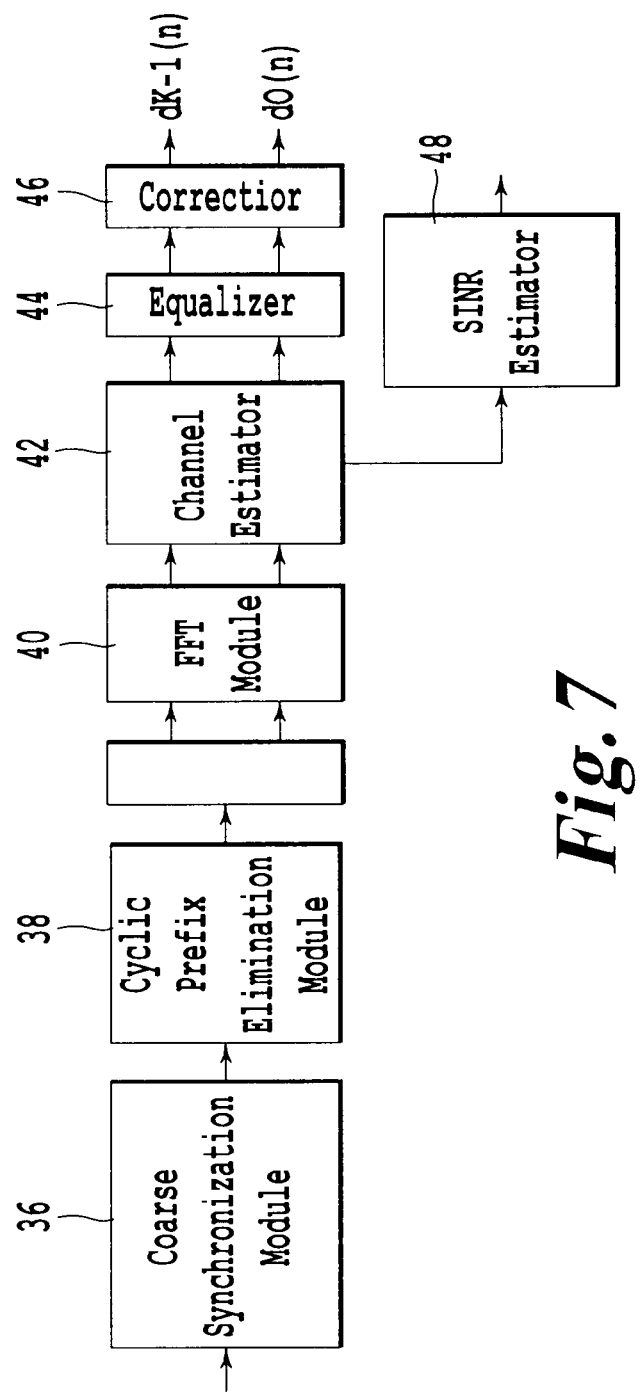
FIG. 7 shows the diagram for an OFDM-CDMA receiver.

The first step is to make a model of a channel seen at the output from the FFT, and then the signal received at the output from the correlation module (module 46 in FIG. 7).

We will then describe the method of estimating the SINR according to the invention.

The following elements will be used in the remainder of this description:

gi(k): coefficient of the equaliser for the $k^{th}$ sub-carrier of the $i^{th}$ OFDM symbol.

P0: power of the spread signal on a spread code, for which the SINR ratio is to be calculated.

$\overline{p}$: average power of spread codes.

ΔF=F02−F01: offset of carrier frequencies between the transmitter and the receiver.

ΔT: offset of sampling clocks between the transmitter and the receiver.

$\sigma^2$: variance of the additive Gaussian noise.

L: length of spread codes.

K: number of transmitted spread codes.

N: size of the FFT.

The load of the system is also denoted α=K/L and the average received power is denoted $$\overline{p} = \frac{1}{K}\sum_{k=0}^{K-1} p_k.$$

Most of these values are usually known before the SINR is estimated.

Some parameters are known through signalling and others can be obtained using a channel estimating mechanism, as for example described in the article by H. Schmidt et al. <<Channel Tracking in Wireless OFDM Systems>>, SCI 2001, Orlando, Fla., 22-25 Jul. 2001.

Figure 1:
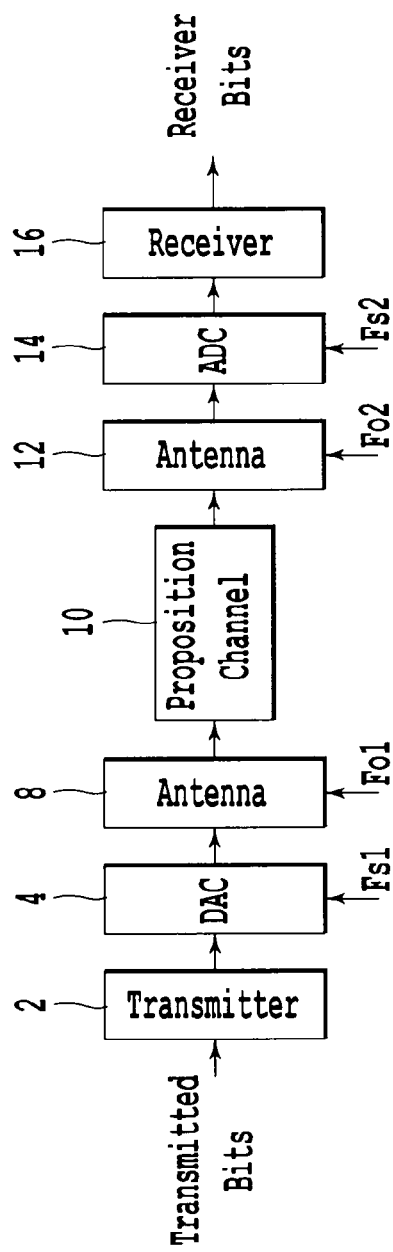
FIG. 1 shows the diagram of a digital radio transmission according to prior art.
Figure 2:
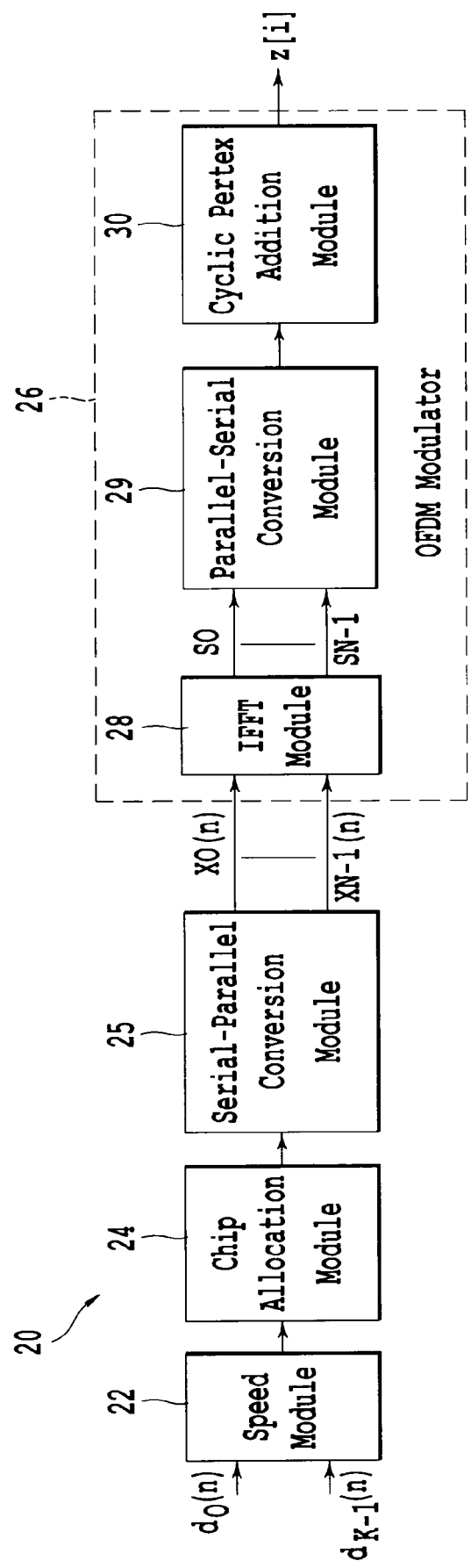
FIG. 2 shows the diagram of a MC-CDMA transmitter according to prior art.
Figure 3:
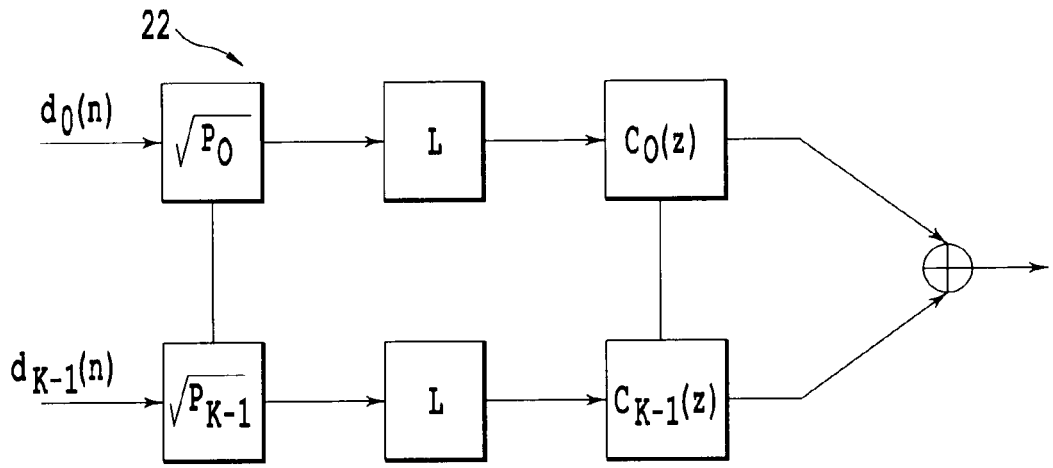
FIG. 3 shows the diagram of spread means.
Figure 4:
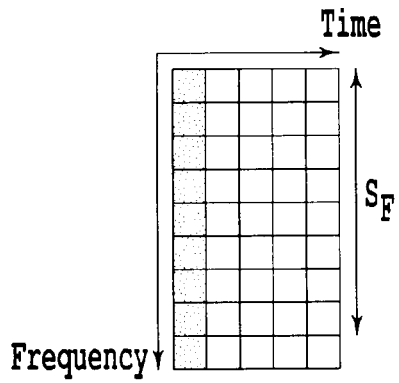
FIGS. 4 to 6 show spread diagrams, for MC-CDMA, MC-DS-CDMA, and in time-frequency respectively.
Figure 5:
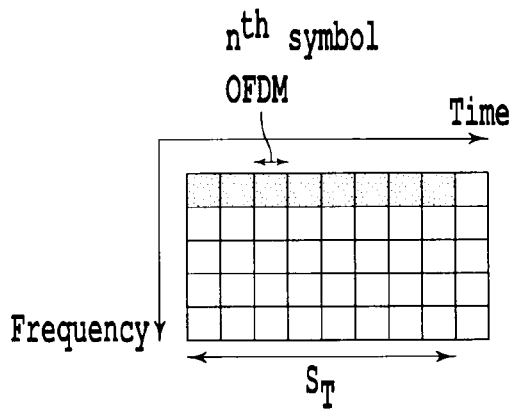
Figure 6:
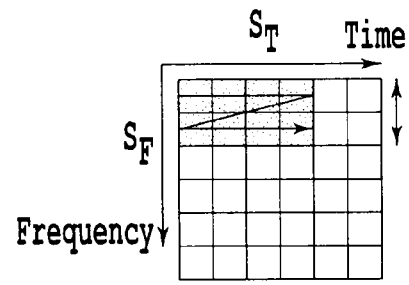

Firstly, the signal is transmitted as described above in relation to FIGS. 2-7, the invention preferably being applied to a single-dimensional spread system (MC-DS-CDMA, with a spread diagram like that shown on FIG. 5, or MC-CDMA with a spread diagram like than shown on FIG. 4), or a time frequency spread system (therefore with a spread diagram like that shown on FIG. 6, where $S_F$ and $S_T$ are both $\neq 1$).

Modelling the Channel:

As explained in the article by H. Steendam and M. Moeneclaey, "The Effect of Synchronization Errors on MC-CDMA Performance", Proceedings of ICC'99, Vancouver, Canada, $H_{nL}+S_{(ti,m)}$ represents the attenuation of the sub-carrier nL+s at the output from the FFT at sampling instant $t_{i,m}=i(N+N_G)(T_S+\Delta T)+m(T_S+\Delta T)$ (m=0, ..., N−1 and $T_S=1/F_{S2}$):

$$H_{nS_F+s}(t_{i,m}) = \sum_{u=-\infty}^{+\infty} e^{j\phi_{i,m}} H\left(\frac{nS_F+s}{NT_S} + \frac{u}{T_S}, i\right) e^{j2\pi\left(\frac{nS_F+s}{N}+u\right)\varepsilon_{i,m}} \quad (1)$$

This formula is valid for an imperfect synchronisation.

$$H\left(\frac{e(nS_F+s)}{NT_S}, i\right)$$

is the channel attenuation for sub-carrier $nS_F+s$ of the $i^{th}$ OFDM symbol, for a perfect synchronization. Therefore it is assumed that the channel can vary from one OFDM symbol to another (depending on i).

The frequency response of the channel is assumed to be centred around the zero frequency:

$$e(k) = \begin{cases} k & \text{if } k \leq N/2 \\ k-N & \text{if } k \geq N/2 \end{cases}.$$

Residual offsets after coarse synchronization are taken into account as follows:

$$\phi_{i,m} = 2\pi\Delta F(m + i(N+N_G))T_S \quad (2)$$

$$\varepsilon_{i,m} = (m + i(N+N_G))\frac{\Delta T}{T_S}$$

Figure 8:
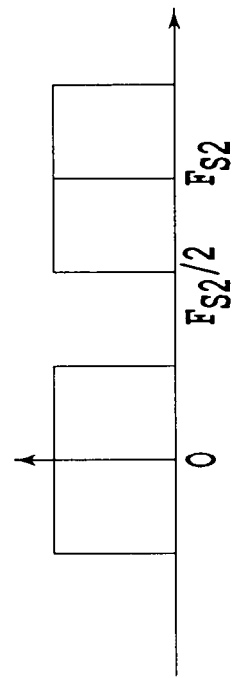
FIG. 8 shows the spectrum of a signal received by a mobile telephony device.

FIG. 8 shows the spectrum of the received signal after sampling at frequency FS2. Sub-carriers are normally cancelled out on each side of the spectrum so as to eliminate folding problems. Thus, the channel model (1) above can be simplified to:

$$H_{nS_F+s}(t_{i,m}) = e^{j\phi_{i,m}} H\left(\frac{e(nS_F+s)}{NT_S}, i\right) e^{j2\pi\frac{e(nS_F+s)}{N}\varepsilon_{i,m}} \quad (3)$$

Modelling the Signal After Equalisation (by Means 44) and Correlation (by Means 46):

In this section, we will present processing done to decode symbols of the user k=0. The results obtained are then identical for other users.

It is also assumed that equaliser coefficients are calculated independently of spread codes.

There may be equalisers MRC, EGC, ZF or MMSEC as described in the article by Maryline Hélard, Rodolphe Le Gouable, J. F Hélard, J. Y. Baudais, <<Multicarrier CDMA techniques for future wideband wireless networks", Ann. Telecom 56, n°5-6, pp. 260-274. 2001.

In the receiver, after elimination of the guard interval, then FFT, then equalisation with a coefficient $g_i[qS_F+p]$ by sub-carrier and correlation, the estimated symbol is:

$$\hat{d}_0[q] = \quad (4)$$

$$\frac{1}{\sqrt{N}}\sum_{p=0}^{S_F-1}\sum_{i=0}^{S_T-1} g_i[qS_F+p]c_0^*[pS_T+i]\sum_{m=0}^{N-1} r_i[m]e^{j\frac{2\pi m(qS_F+p)}{N}} +$$

$$\sum_{p=0}^{S_F-1}\sum_{i=0}^{S_T-1} g_i[qS_F+p]c_0^*[pS_T+i]w_i[qS_F+p]$$

in which:

$$r_i[m] = \frac{1}{\sqrt{N}}\sum_{n=0}^{D}\sum_{s=0}^{S_F-1} x_i[nS_F+s]H_{nS_F+s}(t_{i,m})e^{-j2\pi\frac{m(nS_F+s)}{N}}$$

is the received signal sampled at times $ti,m=i(N+N_G)(T_S+\Delta T)+m(T_S+\Delta T)$ (m=0, ..., N−1), and $w_i[p]$ is a sample of the complex Gaussian noise with variance $\sigma^2$.

We will define the element $T_u(n,q)(s,p)$ $$T_u(n,q)(s,p) = \quad (5)$$

$$\frac{1}{N}\sum_{m=0}^{N-1} e^{j\phi_{u,m}} H\left(\frac{e(nS_F+s)}{NT_S}, u\right) e^{j2\pi\frac{e(nS_F+s)}{N}\varepsilon_{u,m}} e^{j2\pi\frac{m(q-n)S_F+p-s)}{N}}$$

This term is zero for perfect synchronisation, except for n=q. This expression takes account of the channel attenuation by the presence of the function H.

The received signal can then be written as follows:

$$\hat{d}_0[q] = \sum_{k=0}^{K-1}\sum_{n=0}^{D-1}\sum_{p=0}^{S_F-1}\sum_{u=0}^{S_T-1}\sum_{s=0}^{S_F-1} \sqrt{P_k}\, c_0^*[pS_T+u]g_u \quad (6)$$

$$[qS_F+p]T_u(n,q)(s,p)c_k[sS_T+u]d_k[n]+$$

$$\sum_{p=0}^{S_F-1}\sum_{i=0}^{S_T-1} g_i[qS_F+p]c_0^*[pS_T+i]w_i[qS_F+p]$$

We will then attempt to write this equation with matrices and vectors.

This will allow us to apply results derived from the random matrices theory.

We will firstly define the matrices $G(q)$ (equalisation matrix with size $L \times L$), Q (power matrix other than the powers for user <<0>> with size $(K-1) \times (K-1)$), U (matrix of codes other than the code for user <<0>> with size $L \times (K-1)$) and vector $\tilde{d}[n]$ containing $(K-1)$ symbols of users interfering with user 0 in the $n^{th}$ sub-band:

$$G(q) = \begin{bmatrix} G_0(q) & & & & \\ & G_1(q) & & & \\ & & \ddots & & \\ & & & \ddots & \\ & & & & G_{S_F-1}(q) \end{bmatrix} \quad (7)$$

$$G_p(q)_{iv} = \begin{cases} G_p(q)_{ii} = g_i(qS_F + p) \text{ for } i = 0, \ldots, S_T - 1 \\ G_p(q)_{iv} = 0 \text{ for } i \neq v \end{cases}$$

$$Q = \begin{bmatrix} P_1 & & & & \\ & P_2 & & & \\ & & \ddots & & \\ & & & \ddots & \\ & & & & P_{K-1} \end{bmatrix}$$

$$U = (c_1 \ldots c_{K-1})$$

$$\tilde{d}[n] = (d_1[n], \ldots, d_{K-1}[n])^T$$

($C_k$ is a column vector)
We will then define matrices $A(n,q)$ (with size $L \times L$):

$$A(n, q)_{pS_T+u,sS_T+v} = \begin{cases} T_u(n, q)(s, p) \text{ if } u = v \\ 0 \text{ else} \end{cases}, \text{ for } \{p, s\} \quad (8)$$

$$= 0, \ldots, S_F - 1 \text{ and } \{u, v\}$$

$$= 0, \ldots, S_T - 1$$

These matrices represent channel attenuations.
Note that the expression of Tu takes account of channel attenuation by the presence of the function H in this expression (see equation (5)).
This expression (8) is zero for perfect synchronisation, except for n=q.
With these notations, equation (4) can be written:

$$\tilde{d}_0[q] = I_0 d_0[q] + I_1 + I_2 + I_3 \quad (9)$$

$$I_0 = \sqrt{P_0} \, c_0^H G(q) A(q, q,) c_0$$

$$I_1 = \sqrt{P_0} \sum_{\substack{n=0 \\ n \neq q}}^{D-1} c_0^H G(q) A(n, q) c_0 d_0[n]$$

$$I_2 = \sum_{n=0}^{D-1} c_0^H G(q) A(n, q,) U \sqrt{Q} \, \tilde{d}[n]$$

$$I_3 = c_0^H G(q) w[q]$$

wherein:
$I_0$ is the amplitude of the useful signal after equalisation and correlation.
$I_1$ represents interference generated by data for user 0 in other sub-bands.
$I_2$ is the multiple access noise created by other spread codes.
$I_3$ is the Gaussian noise filtered by the equaliser and the sequence of user 0.

Data sources are assumed to be independent and identically distributed (iid), and have a zero average value. Furthermore, symbols transmitted by any one user in different sub-bands are also assumed to be dd.
With these assumptions, $I_1$, $I_2$, and $I_3$ are independent and the SINR of user 0 in sub-band q is:

$$RSIB_0[q] = \frac{E|I_0|^2}{E|I_1|^2 + E|I_2|^2 + E|I_3|^2} \quad (10)$$

The SINR can then be evaluated for an OEDM-CDMA system simultaneously using spreading in the time and frequency domains.
Assuming that:

$$E|d_0[n]d_0[n]^*|^2 = \begin{cases} 1 \sin = p \\ 0 \sin \text{ on} \end{cases} \text{ and}$$

$$E|\tilde{d}[n]\tilde{d}[p]^H|^2 = \begin{cases} I_K \sin = p \\ 0 \sin \text{ on} \end{cases},$$

(this assumption is always valid in mobile communication systems), and it can be demonstrated that:

$$E|I_0|^2 = P_0 |c_0^H G(q) A(q, q,) c_0|^2 \quad (11)$$

$$E|I_1|^2 = P_0 \sum_{\substack{n=0 \\ n \neq q}}^{D-1} |c_0^H G(q) A(n, q,) c_0|^2$$

$$E|I_2|^2 = \sum_{n=0}^{D-1} c_0^H G(q) A(n, q,) U Q U^H A(n, q,)^H G(q)^H c_0$$

$$E|I_3|^2 = \sigma_{tr}^2 (G(q) G(q)^H)$$

Therefore, the calculation of the SINR consists of injecting the results of equation (11) into (10).
However, it is observed that calculations depend on the value of chips of the different spread codes used.
This takes account of orthogonality of codes.
Unfortunately, this is very penalising in practice because the calculations of equation (11) are very complex (resulting in a long calculation time) and have to be started again every time that a spread code is changed due to the presence of c0, c0H, and the matrix U.
Therefore, it would be desirable to calculate these expressions independently of the value of the spread codes, taking account of the code orthogonality property.
This result is obtained using two results originating from the random matrices theory.
The first step is to apply a property initially used in the article by J. Evans and D. N. C Tse, <<Large System Performance of Linear Multiuser Receivers in Multipath Fading Channels>>, IEEE Trans. on Information Theory, pages 2059-2078, September 2000.
If A is a uniformly bounded deterministic matrix with size $L \times L$ and $c_k = (c_k(0), \ldots, c_k(L-1))$ where $c_k(i)$ are random complex variables with zero average value, unit variance and with an order 8 finite moment, then regardless of the value k, and particularly for k=0:

$$C_k^H A c_k \xrightarrow[L\to\infty]{} tr(A) \qquad (12)$$

This property is applied to evaluate $E[|I_0|^2]$ and $E[|I_1|^2]$.

We then apply a premise proven in appendix IV to the article by M. Chaufray, W. Hachem, and Ph. Loubaton, "Asymptotical Analysis of Optimum and Sub-Optimum CDMA Downlink MMSE Receivers", submitted to Trans. on Information Theory, if C=(C0U) is a random matrix with a Haar distribution, then:

$$UQU^H \xrightarrow[L\to\infty]{} \alpha \overline{P}(I - c_0 c_0^H) \qquad (13)$$

This formula takes account of the orthogonality of the codes used.

$\alpha = K/L$ is the system load and $$\overline{p} = \frac{1}{K} \sum_{k=0}^{K-1} p_k$$

is the average received power.

The assumption of the Haar distribution is purely technical. However, the results obtained are fairly independent of this assumption. Results of simulation obtained with a matrix U extracted from the Walsh-Hadamard matrix are very similar to those predicted by theory.

This premise is used to evaluate $E[|I_2|^2]$.

If equaliser coefficients are independent of the spread codes (for example conventional MRC, EGC, ZF or MMSEC), the following formulas are obtained:

$$E|I_0|^2 = P_0 |tr(G(q)A(q,q))|^2 \qquad (14)$$

$$E|I_1|^2 = P_0 \sum_{\substack{n=0 \\ n\neq q}}^{D-1} |tr(G(q)A(n,q))|^2$$

$$E|I_2|^2 = \alpha \overline{p} \sum_{n=0}^{D-1} (tr(G(q)A(n,q)A(n,q)^H G(q)^H) - |tr(G(q)A(n,q))|^2)$$

$$E|I_3|^2 = \sigma_{tr}^2(G(q)G(q)^H)$$

These formulas are simplified when there is no synchronisation error, because then A(n, q)=0 if n≠q.

Calculation of the different elements involved in the SINR calculation then consists of calculating matrix traces, which is fairly easy to implement.

This calculation only uses the matrices G and A, that the receiver knows in any case: A is the channel estimate, and G is the diagonal equalisation matrix.

This calculation remains independent of the codes used, while remaining orthogonal.

Therefore, one embodiment of a method for estimating the SINR according to the invention includes the calculation of variables $E[|I0|^2]$, $E[|I1|^2]$, $E[|I2|^2]$, $E[|I_3|^2]$ in accordance with equations (11) or (14), using matrix A(n,q) from (8).

An evaluation method according to the invention can easily be programmed in a reception device like a mobile telephone that, as already mentioned above, is likely to contain data about matrices A and G.

Figure 9:
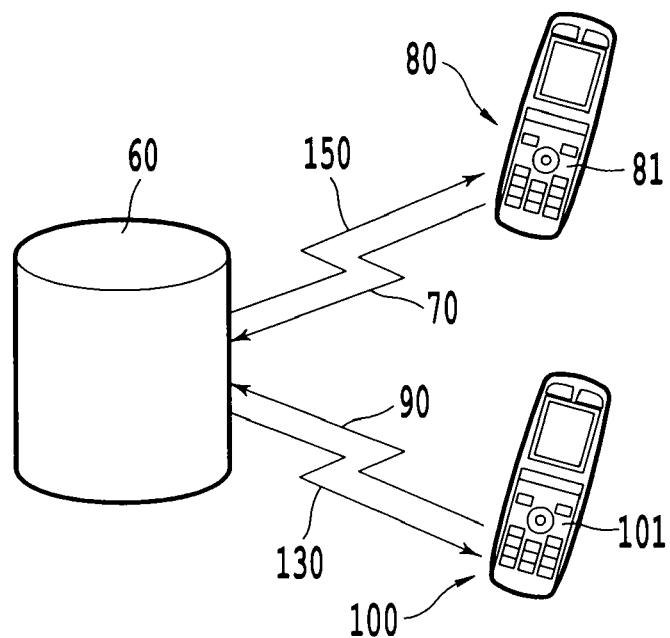
FIGS. 9 and 10 show structures of a message distribution system on mobile telephony devices and a diagram of components in a mobile telephony device.

A mobile device and a transmission system using the invention will now be described with reference to FIGS. 9 and 10.

The system comprises a mobile telephony distribution network 60 (RTM) composed of a network server and a transmission infrastructure, for example a radio transmission, and a set of reception equipment, wireless, mobile or portable, for example mobile telephones 80, 100, . . . associated with the network.

Messages 130, 150 are sent to the mobile telephones 80, 100 that retransmit information 70, 90 in return, for example information related to the SINR ratio calculated by each of them.

Figure 10:
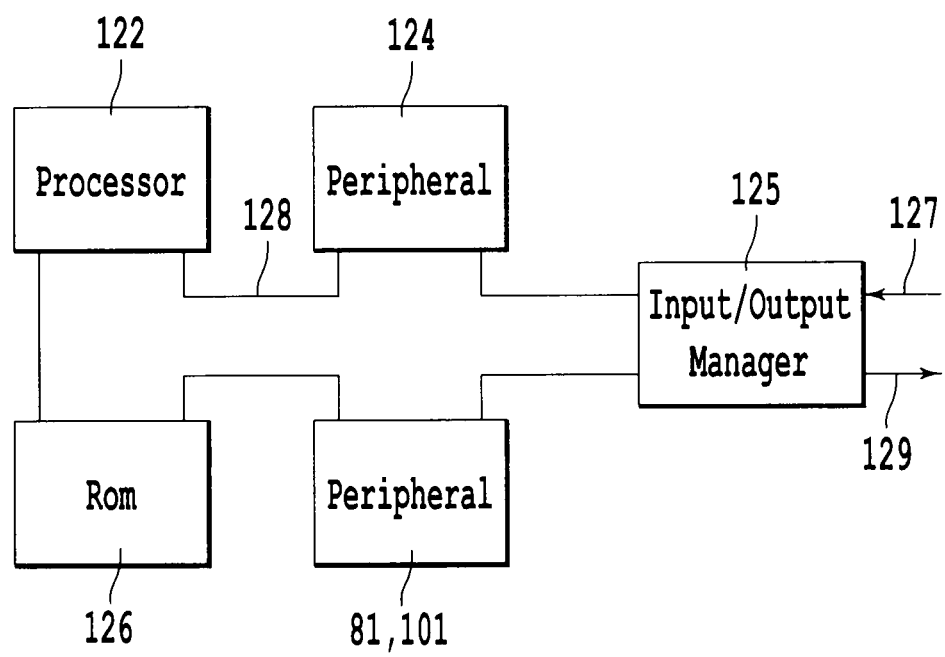

Each mobile communication equipment provides a structure like that shown on FIG. 10, and is equipped with a microprocessor and memory areas.

The assembly comprises at least one processor 122, a set of RAM memories 124 (for data storage), and ROM memories 126 (for example for storage of program instructions). These various elements are connected through a bus 128.

A peripheral element such as a keyboard (indicated by references 81 and 101 on FIG. 9), enables a user to enter data, for example in response to a message displayed on his display screen.

Other peripheral elements may be used to input data, for example such as a voice control device or a touch screen.

The data can also be entered using a combination of peripherals like those mentioned above as an example.

Reference 125 denotes means of management of inputs 127 and outputs 129.

Each equipment can also be considered as using the functions described above with reference to FIG. 7.

Data related to an operating system are memorised telephone.

In the case of a mobile telephone, a SIM card (GSM) or a USIM card (UMTS) may be added, with means of reading this card.

Program data to calculate the SINR ratio as described above are loaded into a memory area of each mobile telephone.

A mobile device such as the devices 81, 101 is provided with memory means to memorise data related to matrices A and G, and the various parameters used in the formula (14) above.

The SINR may be calculated by each mobile device itself and then sent to the base transmitter station 60 that will use the SINR information from the different users, to adjust the various transmission parameters (for example the power allocated to a specific user, or the flow allocated to each user).

As already mentioned, the estimate made according to the invention is more reliable than the estimate that was made in the past.

Therefore, it enables improved management of operating parameters of a base transmitter station, since the base transmitter station can have more reliable information.

Despite the various assumptions made to obtain the formulas (14) above, they are more generally more valid and provide a better estimate of the SINR ratio than in prior art.

The invention claimed is:

1. A method of estimating an SINR (signal to interference-plus-noise ratio) of an OFDM-CDMA transmission signal spread with spread codes, said transmission signal being transmitted between a transmission apparatus and a receiver apparatus, said method comprising:

receiving the signal spread with spread codes at the receiver apparatus; and calculating, with a processor at the receiver apparatus, an estimate of the SINR ratio for the signal spread with the spread codes independently of a value of the spread codes according to a formula defined by:

$$RSIB_0[q] = \frac{E|I_0|^2}{E|I_1|^2 + E|I_2|^2 + E|I_3|^2},$$

wherein $$E|I_0|^2 = P_0|tr(G(q)A(q,q))|^2$$

$$E|I_1|^2 = P_0 \sum_{\substack{n=0 \\ n \neq q}}^{D-1} |tr(G(q)A(n,q))|^2$$

$$E|I_2|^2 = \alpha \bar{p} \sum_{n=0}^{D-1} (tr(G(q)A(n,q)A(n,q)^H G(q)^H) - |tr(G(q)A(n,q))|^2)$$

$$E|I_3|^2 = \sigma^2 tr(G(q)G(q)^H)$$

$I_0$ represents an amplitude of the signal spread with spread codes for a user after equalization and correlation, $I_1$ represents interference generated by data of the user considered in other sub-bands, $I_2$ represents multiple access noise created by other spread codes, $I_3$ represents Gaussian noise filtered by an equalizer and sequence of the user considered, $\alpha$ is system load and $\bar{p}$ is average received power, $P_0$ is power of the signal spread with the spread codes for which the SINR is calculated, A and G are attenuation channel and equalization matrices, respectively, D is a number of data symbols per code on $S_T$ OFDM symbols, and q is a sub-band in which the SINR is calculated.

2. The method set forth in claim 1, wherein the spread codes are orthogonal, and the calculating the estimate of the SINR ratio is based on the orthogonality of the spread codes.

3. The method set forth in claim 1, wherein the spread codes are two-dimensional or single dimensional.

4. The method set forth in claim 1, further comprising:

carrying out MRC (maximum ratio combining), EGC (equal gain combining), ZF (zero forcing), or MMSEC (minimum mean square error combining) equalization.

5. The method set forth in claim 1, further comprising:

transmitting, at said transmitting apparatus, signals toward the receiver apparatus, the receiver apparatus being a wireless telephony apparatus; and transmitting, at the receiver apparatus, the calculated estimate of the SINR ratio to the transmitter apparatus.

6. A wireless telephony apparatus comprising:

a receiver which receives an OFDM-CDMA transmission a signal spread with spread codes; and an estimating processor which calculates an estimate of an SINR (signal to interference-plus-noise ratio) of the signal spread with spread codes independently of a value of the spread codes according to a formula defined by:

$$RSIB_0[q] = \frac{E|I_0|^2}{E|I_1|^2 + E|I_2|^2 + E|I_3|^2},$$

wherein $$E|I_0|^2 = P_0|tr(G(q)A(q,q))|^2$$

$$E|I_1|^2 = P_0 \sum_{\substack{n=0 \\ n \neq q}}^{D-1} |tr(G(q)A(n,q))|^2$$

$$E|I_2|^2 = \alpha \bar{p} \sum_{n=0}^{D-1} (tr(G(q)A(n,q)A(n,q)^H G(q)^H) - |tr(G(q)A(n,q))|^2)$$

$$E|I_3|^2 = \sigma^2 tr(G(q)G(q)^H)$$

$I_0$ represents amplitude of the signal spread with spread codes for a user after equalization and correlation, $I_1$ represents interference generated by data of the user considered in other sub-bands, $I_2$ represents multiple access noise created by other spread codes, $I_3$ represents Gaussian noise filtered by an equalizer and sequence of the user considered, $\alpha$ is system load and $\bar{p}$ is average received power, $P_0$ is power of the signal spread with the spread codes for which the SINR is calculated, A and G are attenuation channel and equalization matrices, respectively, D is a number of data symbols per code on $S_T$ OFDM symbols, and q is a sub-band in which the SINR is calculated.

7. The device set forth in claim 6, wherein the spread codes are orthogonal, and the estimating processer estimates the SINR ratio based on the orthogonality of the spread codes.

* * * * *